United States Patent [19]

Yamasoe

[11] Patent Number: 5,399,192
[45] Date of Patent: Mar. 21, 1995

[54] CHEMICALS AND METHOD FOR FORMING CURED COAT HAVING LUBRICATING AND HYDROPHILIC PROPERTIES

[75] Inventor: Katsuyoshi Yamasoe, Yotsukaido, Japan

[73] Assignee: Nippon Paint Co., Ltd., Osaka, Japan

[21] Appl. No.: 99,408

[22] Filed: Jul. 30, 1993

Related U.S. Application Data

[63] Continuation of Ser. No. 662,604, Mar. 1, 1991, abandoned.

[30] Foreign Application Priority Data

Mar. 2, 1990 [JP] Japan .................................. 2-51186

[51] Int. Cl.$^6$ ................. C09D 101/28; C09D 133/08; C09D 175/04; C09D 191/00; C09D 163/00
[52] U.S. Cl. .................... 106/186; 106/171; 106/243; 25 L/11; 25 L/25; 524/300; 524/394; 524/399; 524/400; 524/401
[58] Field of Search ............... 25 L/11, 25; 524/300, 524/394, 399, 400, 401; 106/171, 197.2, 243

[56] References Cited

U.S. PATENT DOCUMENTS

| | | | |
|---|---|---|---|
| 3,471,304 | 10/1969 | Hamdy et al. | 106/171 |
| 3,503,743 | 3/1970 | Kosar | 106/171 |
| 4,341,563 | 7/1982 | Kurihara et al. | 106/171 |
| 4,564,560 | 1/1986 | Tani et al. | 427/146 |
| 5,096,490 | 3/1992 | Burdick | 106/171 |

FOREIGN PATENT DOCUMENTS

| | | |
|---|---|---|
| 61-60766 | 3/1986 | Japan . |
| 61-183394 | 3/1986 | Japan . |
| 62-41467 | 9/1987 | Japan . |
| 63-86764 | 4/1988 | Japan . |
| 63-170492 | 7/1988 | Japan . |

OTHER PUBLICATIONS

Abridged translation of Japanese Patent Laid-Open. 61-60766 Mar. 1986.
Abridged translation of Japanese Patent Laid-Open 61-183394 Aug. 1986.
Abridged translation of Japanese Patent Laid-Open 63-86764 Apr. 1988.
Abridged translation of Japanese Patent Laid-Open 63-170492 Jul. 1988.
Abridged translation of Japanese Patent Laid-Open 62-41467 Sep. 1987.

*Primary Examiner*—David Brunsman
*Attorney, Agent, or Firm*—Sughrue, Mion, Zinn, Macpeak & Seas

[57] ABSTRACT

Aluminum or aluminum alloy substrates are coated with primer coating chemicals and topcoating chemicals for forming a cured primer coat having lubricating and hydrophilic properties. The primer coating chemicals contains a thermosetting water-soluble or water-dispersible resin component (A), and the topcoating chemicals contains a resin component (C) containing a carboxymethylcellulose derivative and N-methylolacrylamide. At least one of them further contains a lubricant (B) selected from the group consisting of a higher aliphatic acid lubricant and an inorganic lubricant.

7 Claims, No Drawings

CHEMICALS AND METHOD FOR FORMING CURED COAT HAVING LUBRICATING AND HYDROPHILIC PROPERTIES

This is a continuation of application Ser. No. 07/622,604, filed Mar. 1, 1991, now abandoned.

BACKGROUND OF THE INVENTION

The present invention relates to chemicals and a method for imparting a hydrophilic property to aluminum or aluminum alloy substrates such as aluminum fins for heat exchangers, and more particularly to chemicals and a method for providing aluminum or aluminum alloy substrates with lubricating and hydrophilic properties.

Since aluminum and its alloys are light in weight and have excellent workability and heat conductivity, they are widely used for heat exchangers, etc. With air conditioning systems finding wider applications, air conditioners for cooling, warming, dehumidifying, etc., are increasingly used. Heat exchangers of these air conditioners are generally equipped with aluminum alloy fins.

However, it is observed that moisture tends to be condensed and deposited as water droplets on the fin surfaces of air conditioners during cooling operations. If the fin surface is water-repellent, this condensed water tends to be deposited in a hemispherical form on the fin surface or forms bridges between the fins, preventing smooth air flow, which in-turn increases resistance of air flow, thereby decreasing heat exchange efficiency. Accordingly, the fin surfaces are treated so that they have a hydrophilic property.

In the case of working the aluminum or aluminum alloy substrates such as aluminum plates, a working oil is generally applied to aluminum plates precoated with hydrophilic layers for the purpose of improving workability and protecting the surfaces of the aluminum plates. After working, the working oil conventionally is removed in a degreasing step by using a fluorocarbon solvent (Flon) as a detergent. However, the recent trend of environmental protection regulates the use of Flon, so that other working methods without using Flon are being sought. As a result, volatile solvent-type lubricants based on low-boiling point paraffins or naphthenes which do not require a washing step have been being used as working oils for fin plates.

However, when such volatile lubricating oils are used, substrate surfaces have a poor lubricating property, causing such problems as poor workability in stamping, drawing, etc. Thus, it has been desired to provide the hydrophilic coats themselves with a lubricating property to improve their workability.

In these circumstances, Japanese Patent Laid-Open No. 61-183394 discloses a lubricating agent containing fine pulverous water-swellable hydroxypropyl cellulose having a low degree of substitution for cold plastic working, which lubricating agent consists of 15-35 weight % of at least one inorganic lubricant selected from $MoS_2$ and graphite, 1-5 weight % of at least one water-soluble resin selected from hydroxypropyl cellulose, hydroxypropyl methyl cellulose, and methyl cellulose, and water as primary components. A suitable amount of the water-soluble hydroxypropyl cellulose having a low degree of substitution (preferred degree of substitution is 7-14 weight %, and the substituent is a hydroxypropoxy group) to be added to the composition is 0.1-5.0 weight %.

However, since this lubricating agent contains hydroxypropyl cellulose and/or hydroxypropyl methyl cellulose and/or methyl cellulose and is directly applied to a metal substrate without a thermoset primer coat, the resulting hydrophilic coat is likely to peel off from the metal substrate. Although the resulting hydrophilic layer has a lubricating property, the coating layer is poor in durability.

Japanese Patent-Laid-Open No. 63-170492 discloses a method of working an aluminum fin plate for a heat exchanger in which fine powder of lubricant, such as stearic acid or a fluorine resin, is adhered to the surface of an aluminum fin material in the form of a thin film with a hydrophilic surface, with a water-soluble resin as a binder. Then press working is carried out. The adhesion is carried out at 100°–300° C. by baking. The water-soluble resin is preferably an acrylic acrylamide copolymer.

However, since this layer is removed after working, the resulting fins do not have any hydrophilic property and alkali resistance.

In general, to improve the workability of the metal substrates such as aluminum substrates, such metal substrates are coated with lubricating resin layers, and when they have resin coatings like precoated plates, a lubricating agent is added to the precoat layers to provide them with a lubricating property. For instance, Japanese Patent Publication No. 62-41457 discloses an aluminum plate having excellent drawing workability, a surface of which aluminum plate is coated with a particular amount of a surface treatment solution containing a water-soluble thermoplastic polymer resin consisting of an ammonium salt of a copolymer of $\alpha$-olefin and $\alpha,\beta$-unsaturated carboxylic acid. Also, Japanese Patent Laid-Open No. 63-86764 discloses a composition for forming a lubricating layer on a metal surface, which comprises 20-95 weight % of a thermosetting resin and 5-80 weight % of a inorganic lubricant.

However, the surface treatment solution used in Japanese Patent Publication No. 62-41467 and the composition disclosed by Japanese Patent Laid-Open No. 63-86764 fail to produce coating layers having such a good hydrophilic property as to satisfy the requirements of cross fin plates for heat exchangers, etc.

On the other hand, Japanese Patent Laid-Open No. 61-60766 discloses an aqueous composition for forming a lubricating coating layer consisting essentially of a water-soluble or water-dispersible organic resin, an organic-inorganic composite reaction product consisting of an alkoxy- (or alkoxyalkoxy-) silane compound and silica, and a lubricant. The coating layer obtained by this aqueous composition has a hydrophilic property to some extent, but this hydrophilic property is not necessarily sufficient for the present demand. Also, when this composition is applied to cross fins of heat exchangers, it generates an odor peculiar to silica, causing an unpleasant feeling.

As described above, it is difficult to form a coating layer having not only a good hydrophilic property but also an excellent lubricating property, and particularly now that a volatile solvent-type lubricant is required to be used as a working oil due to the prohibition of Flon, it is strongly desired to provide coating layers satisfying the above two requirements.

OBJECT AND SUMMARY OF THE INVENTION

Accordingly, an object of the present invention is to provide chemicals and a method of forming a cured coat having an improved lubricating property without deteriorating its hydrophilic property.

As a result of intense research in view of the above object, the inventor has found that by adding a particular amount of a higher aliphatic acid lubricant and/or a inorganic lubricant to at least one of the primer coating chemicals or the topcoating chemicals, a coating layer having not only a good hydrophilic property but also an excellent lubricating property can be obtained. The present invention has been completed based upon this finding.

Thus, the primer coating chemicals for forming a cured primer coat having lubricating and hydrophilic properties according to the present invention, comprises a thermosetting water-soluble or water-dispersible resin component (A), and a lubricant (B) selected from the group consisting of a higher aliphatic acid lubricant and a inorganic lubricant, a resin component-/lubricant ratio (A/B) by weight on a solid basis being:
(a) where the lubricant is the higher aliphatic acid lubricant, 95/5 to 70/30,
(b) where the lubricant is the inorganic lubricant, 95/5 to 20/80, and
(c) where the lubricant consists of the higher aliphatic acid lubricant and the inorganic lubricant, 95/5 to 20/80, a weight ratio of the resin component (A) to the higher aliphatic acid lubricant being 95/5 to 70/30.

The topcoating chemical for forming a lubricating and hydrophilic topcoat according to the present invention, comprises a resin component (C) containing a carboxymethylcellulose derivative and N-methylolacrylamide, and a lubricant (B) selected from the group consisting of a higher aliphatic acid lubricant and an inorganic lubricant, a resin component/lubricant ratio (C/B) by weight on a solid basis being:
(a) where the lubricant is the higher aliphatic acid lubricant, 95/5 to 70/30,
(b) where the lubricant is the inorganic lubricant, 95/5 to 20/80, and
(c) where the lubricant consists of the higher aliphatic acid lubricant and the inorganic lubricant, 95/5 to 20/80, a weight ratio of the resin component (C) to the higher aliphatic acid lubricant being 95/5 to 70/30.

The method of providing an aluminum or aluminum alloy substrate with a cured coat having lubricating and hydrophilic properties according to the present invention, comprises the steps of:
(a) forming a hydrophilic primer coat by applying a primer coating chemicals containing a thermosetting water-soluble or water-dispersible resin component (A);
(b) forming a hydrophilic topcoat by applying a topcoating chemical containing a resin component (C) contaning a carboxymethylcellulose derivative and N-methylolacrylamide; and
(c) baking the resulting coat,
wherein at least one of the primer coating chemicals and topcoating chemicals further contains a higher aliphatic acid lubricant and/or a inorganic lubricant.

DETAILED DESCRIPTION OF THE INVENTION

The primer coating chemicals used in the present invention contain a thermosetting water-soluble or water-dispersible resin component. The thermosetting water-soluble or water-dispersible resin component is a thermosetting resin having hydrophilic groups such as a carboxyl group, a hydroxyl group, an amino group, etc., which is water-soluble or water-dispersible.

Such a thermosetting water-soluble or water-dispersible resin component (A) includes, for instance, acrylic copolymer resins, urethane resins, alkyd resins, epoxy resins, thermosetting polyamide resins, etc. These resins may contain small amounts of thermoplastic resins such as polyvinyl resins, polybutadiene resins, polyolefin resins, etc. These thermosetting resins may be used in combination or in the form of their adducts depending upon the applications.

The acrylic copolymer resins include, for instance, acrylic copolymer resins modified with urethane resins, alkyd resins, epoxy resins, polybutadiene resins, polyamide resins, etc. The alkyd resins may be those modified with oils, acrylic resins, epoxy resins, etc., and may contain polyester resins, etc.

The water solubility or the water dispersibility can be achieved by adding ammonia water, amine compounds, organic acids such as lactic acid, etc., or inorganic acids such as phosphoric acid to the resins depending upon their functional groups bonded to their skeletons (carboxyl group, hydroxyl group, amino group, etc.), neutralizing them and stirring the resulting mixtures.

The essential properties to the primer layers formed by the primer coating chemicals based on the above resins are a corrosion resistance, an alkali resistance, an adhesion between the aluminum substrate and a topcoat, etc. In the case of imparting the lubricating property to this primer layer according to the present invention, a lubricant is added to the primer coating chemicals containing the above resins as described below in detail.

Specific examples of the primer coating chemicals to which the lubricant is added include aqueous polyesterurethanes (HYDRAN Series, manufactured by Dainippon Ink and Chemicals, Inc.), aqueous urethane ionomers (SUPERFLEX Series, manufactured by Daiichi Kogyo Seiyaku Co., Ltd.), aqueous epoxies (EPOLSION Series, manufactured by Kanebo NSC), aqueous acrylics (YODOSOL Series, manufactured by Kanebo NSC), aqueous polyesters (VIRONAL Series, manufactured by Toyobo Co., Ltd.), etc.

Incidentally, when a hydrophilic topcoating chemicals, which will be described below in detail, contain a lubricant, and when primer coating chemicals do not contain a lubricant, the primer coating chemicals may be a resin primer usually used for aluminum plates, steel plates, etc., a coating-type chromate treatment liquid (for instance, SURFALCOAT NR-2, manufactured by Nippon Paint Co., Ltd.), zircon-type organic-inorganic composite treatment agent (for instance, SURFALCOAT 430A/B, manufactured by Nippon Paint Co., Ltd.), etc.

The topcoating chemicals used in the present invention include a carboxymethylcellulose derivative and N-methylolacrylamide as a resin component (C). The term "carboxymethylcellulose derivative" used herein means a water-soluble or water-dispersible salt of carboxymethylcellulose. A preferred example of such a hydrophilic topcoating chemical is a topcoating chemical comprising 5–25 parts by weight of a sodium salt and/or a potassium salt of a carboxymethylcellulose, 25–50 parts by weight of an ammonium salt of carboxymethylcellulose, and 25–70 parts by weight of N-methylolacrylamide, on a solid basis. In addition to the above components, the topcoating chemicals may further contain polyacrylic acid and a zirconium compound. In this case, the amount of polyacrylic acid is 1.5–15 parts by weight and the amount of the zirconium compound is 0.6–9 parts by weight as Zr, per 100 parts by weight of the total of the above components. Incidentally, the above hydrophilic topcoating chemicals may optionally contain fungicides, antiseptics, etc.

In the present invention, as a lubricant, a higher aliphatic acid lubricant and a inorganic lubricant may be used alone or in combination. As the higher aliphatic acid lubricant, metal salts or ammonium salts of higher aliphatic acids having a carbon number of 10–21 are preferable, and metal salts of stearic acid are particularly preferable. The metal components in these salts may be Ca, Zn, Al, Na, K, etc. Also, as the inorganic lubricant, graphite, molybdenum disulfide, graphite fluoride, etc. may be used. These lubricants may be used alone or in combination.

Next, the proportions of the lubricant in the primer coating chemicals and the topcoating chemicals will be explained below.

(1) Where the higher aliphatic acid lubricant is used as the lubricant

In the case of adding the higher aliphatic acid lubricant to the primer coating chemicals, a weight ratio of the resin component (A) to the higher aliphatic acid lubricant (B) in the primer coating chemicals on a solid basis is 95/5–70/30, preferably 85/15–60/40.

Similarly, in the case of adding the higher aliphatic acid lubricant to the topcoating chemicals, a weight ratio of the resin component (C) containing a carboxymethylcellulose derivative and N-methylolacrylamide to the higher aliphatic acid lubricant (B) on a solid basis is 95/5–70/30, preferably 85/15–60/40.

When the amount of the higher aliphatic acid lubricant is smaller than 5 parts by weight, per 95 parts by weight of the resin component in the primer coating chemicals or the topcoating chemicals, the resulting layer does not have a fully improved lubricating property. On the other hand, when the amount of the higher aliphatic acid lubricant is added in an amount exceeding 30 parts by weight per 70 parts by weight of the resin component, an adhesion between the topcoat formed by the topcoating chemicals and the primer coat formed by the topcoating chemicals is poor, and the resulting layer shows a poor hydrophilic property.

(2) Where the inorganic lubricant is used as the lubricant

In both cases of the primer coating chemicals and the topcoating chemicals, a weight ratio of the resin component to the inorganic lubricant on a solid basis is 95/5–20/80, preferably 85/15–30/70. When the amount of the inorganic lubricant is less than 5 parts by weight per 95 parts by weight of the resin component, the resulting layer does not show a sufficiently improved lubricating property. On the other hand, the amount of the inorganic lubricant exceeds 80 parts by weight per 20 parts by weight of the resin component, the resulting layer shows a poor alkali resistance, and the adhesion between the topcoat and the primer coat is undesirably reduced.

(3) Where both of the higher aliphatic acid lubricant and the inorganic lubricant are used as the lubricant In both cases of the primer coating chemicals and the topcoating chemicals, a weight ratio of the resin component in the chemicals to the lubricant (the total of the higher aliphatic acid lubricant and the inorganic lubricant) on a solid basis is 95/5–20/80, preferably 85/15–30/70. In this case, the amount of the higher aliphatic acid lubricant is within the range of 95/5–70/30, preferably 85/15–60/40, relative to the resin component. When the total amount of the lubricant is less than 5 parts by weight per 95 parts by weight of the resin component, the resulting layer does not show a sufficient lubricating property. On the other hand, when the total amount of the lubricant exceeds 80 parts by weight per 20 parts by weight of the resin component, the resulting layer shows a poor alkali resistance, and the adhesion between the topcoat and the primer coat is also poor.

With respect to the proportion of the higher aliphatic acid lubricant to the resin component, when the amount of the higher aliphatic acid lubricant in the lubricant exceeds 30 parts by weight per 70 parts by weight of the resin component, the resulting layer shows an inferior hydrophilic property. Therefore, even when both of the higher aliphatic acid lubricant and the inorganic lubricant are added, the amount of the higher aliphatic acid lubricant should be at a weight ratio of up to 30/70 to the resin component in both of the primer coating chemicals and the topcoating chemicals.

Incidentally, in the present invention, for the purpose of improving a corrosion resistance and an alkali resistance, resin curing agents or inorganic curing agents may be added to the primer in addition to the above primer components. The resin curing agents may be aqueous melamines, blocked isocyanates, epoxy resins, etc. The inorganic curing agents may be water-soluble polyvalent metal salts, such as chromates, vanadium salts, zirconium salts, molybdenates, cerium salts, etc.

The method of treatment according to the present invention will be explained below.

First, a metal substrate is subjected to a degreasing treatment. The degreasing treatment may be degreasing with solvents such as trichloroethylene, perchloroethylene, gasoline, normal hexane, etc., or alkali degreasing with alkali agents such as sodium hydroxide, sodium carbonate, sodium silicate, sodium phosphate, etc.

The degreased metal substrate is washed with water and dried, followed by primer coating. In this case, the primer coating chemicals containing the above lubricant may be used. When a lubricant is added only to the topcoating chemicals, usual primer coating chemicals can be used.

The amount of the primer coating chemicals is preferably 0.10–2.0 g/m$^2$ on a dry coat basis in a case where the primer coating chemicals contains the lubricant. When the primer coat is less than 0.10 g/m$^2$, it shows a poor alkali resistance. On the other hand, even though it exceeds 2.0 g/m$^2$, the resulting primer coat does not show further improved properties, meaning that it is economically undesirable.

After applying the primer coating chemicals, baking is conducted. Baking is preferably conducted at 220°–260° C., particularly about 240° C. for 10–60 seconds, particularly 30 seconds.

Next, topcoating chemicals are applied to the primer coat obtained in the previous step. The amount of the topcoating chemicals is preferably 0.05–0.4 g/m$^2$ on a dry coat basis. When it is less than 0.05 g/m², the resulting topcoat shows a poor hydrophilic property. On the other hand, when it exceeds 0.4 g/m², the topcoat has a poor adhesion to the primer coat.

The baking of the topcoat is preferably conducted under the conditions of 200°–240° C., particularly about 220° C. for 10–60 seconds, particularly about 30 seconds.

The method of applying the primer coating chemicals and the topcoating chemicals in the present invention may be the same as usual methods of forming primer coats and topcoats, and its examples are a spray method, a brushing method, an immersion method, etc.

In the method of the present invention, the lubricant may be added to either one or both of the primer coating chemicals and the topcoating chemicals. In a preferred embodiment, the lubricant is added to the primer coating chemicals so that the primer coat contains the lubricant. Since the topcoat is generally thin, if the lubricant is added only to the topcoat to obtain a sufficient lubricating property, the proportion of the lubricant in the topcoat would have to be increased, failing to meeting both requirements of a good adhesion between the topcoat and the primer coat and a good hydrophilic property.

Incidentally, the mixing of the lubricant with the primer coating chemicals or the topcoating chemicals can be easily conducted by stirring using a dissolver, etc. In this case, the lubricant is used preferably in the form of an aqueous dispersion by using surfactants, etc.

By adding the lubricant to at one of the primer coating chemicals and the topcoating chemicals and forming a primer coat and a topcoat by using these chemicals, a coating layer having an excellent lubricating property can be obtained.

In addition, by using the primer coating chemicals containing thermosetting water-soluble or water-dispersible resin component and the topcoating chemicals containing a carboxymethylcellulose derivative and N-methylolacrylamide, and by adding proper amounts of the lubricant to these chemicals, surface coating layers having further improved lubricating and hydrophilic properties can be obtained.

The present invention will be described in further detail by way of the following Examples.

EXAMPLE 1

63.4 parts by weight of a thermosetting aqueous polyester-urethane resin (HYDRAN HW-350, manufactured by Dainippon Ink and Chemicals, Inc., resin component: 30%), 2 parts by weight of an aqueous calcium stearate dispersion (AFCO DISPER C, manufactured by Adeka Fine Chemicals K.K., purity: 50%), 1.0 part by weight of a coloring pigment (SUNDAY SUPERBLUE GLL, manufactured by Sanyo Shikiso K.K.) and 47 parts by weight of pure water were mixed while stirring for 5 minutes by a dissolver, and subjected to filtration with a 100-mesh-filter to obtain a lubricating primer coating chemicals.

An aluminum fin plate (0.11 mm×200 mm×300 mm) was degreased with an alkali degreasing agent (SURFCLEANER 322N-8, manufactured by Nippon Paint Co., Ltd.), washed with water and dried. It was then coated with the above lubricating primer coating chemicals by a roll coating method. The resulting coat was baked at 240° C. for 30 seconds in a hot air-circulating furnace. The coat obtained by the lubricating primer coating chemicals was 1 g/m².

It was further coated with a hydrophilic chemicals (SURFALCOAT 160, manufactured by Nippon Paint Co., Ltd.) by a roll coating method, and baked at 220° C. for 30 seconds in a hot air-circulating furnace. The amount of the coat obtained by this hydrophilic chemicals was 0.2 g/m².

Test pieces were obtained from the resulting coated aluminum fin plates, and the coat of each test piece was measured with respect to a friction coefficient, an adhesion, the durability of a hydrophilic property and an alkali resistance under the following conditions.

(1) Friction coefficient

Using a HEIDON surface test machine (HEIDON-14 type), a friction coefficient was measured by moving the test piece at a speed of 30 cm/sec while being pressed by a pressing member (material: hardened steel) having a diameter of 5 mm under a load of 200 g. Its evaluation was conducted by the following standards:

$\mu$: Friction coefficient.

⊚: $\mu \leq 0.20$.

○: $0.20 < \mu \leq 0.25$.

Δ: $0.25 < \mu \leq 0.27$.

x: $0.27 < \mu$.

(2) Adhesion

A surface coat of each test piece was cut by a knife in a checkerboard pattern to have 100 separate square areas of 1 mm×1 mm. A cellophane tape was adhered onto the sample and then peeled off. The number of remaining square areas was counted to evaluate the adhesion.

The number of remaining square areas

⊚: 100.

○: 99–80.

Δ: 79–60.

x: 59 or less.

(3) Durability of hydrophilic property

Each sample was subjected to five cycles of treatment, each of which consisted of keeping it in contact with running water (5 l/hr) for 17 hours and drying it at 80° C. for 7 hours. After that, 5 μl of deionized water was dropped onto a flat surface of each sample held horizontally to measure a contact angle Q of a water droplet by a goniometer. The contact angle Q was classified into the following categories:

⊚: $Q < 20°$.

○: $20° \leq Q < 30°$.

Δ: $30° \leq Q < 40°$.

x: $40° \leq Q$.

(4) Alkali resistance

The test piece was immersed in SURFCLEANER 53 (manufactured by Nippon Paint Co., Ltd.) degreasing solution as an alkali detergent under the following conditions, and washed with tap water for 10 seconds to evaluate the coat before and after immersion.

Immersion Condition

Concentration of SURFCLEANER 53: 2.0 weight %.

Immersion temperature: 70° C.

Immersion time: 1 minute.

The standard of evaluation of the coat surface was as follows:

⊚: No swelling.

○: Substantially no swelling (swelled area: less than 5%).

Δ: Considerably swelled (swelled area: 5% or more).

x: Totally swelled or partially peeled.

The test results are shown in Table 1.

EXAMPLES 2-19

Example 1 was repeated to prepare test pieces except for adding lubricants shown in Table 1 to the primer coating chemicals in concentrations as shown in Table 1. Various tests were conducted in the same manner as in Example 1. The results are shown in Table 1.

EXAMPLE 20

The same aluminum fin plate as in Example 1 was subjected to degreasing, washing with water and drying. It was then coated with SURFALCOAT 430A/B (manufactured by Nippon Paint Co., Ltd.) as a primer coating chemicals by a roll coating method, and dried at 150° C. for 5 seconds in a hot-air circulating surface. The amount of a primer coat obtained by this primer coating chemicals was 0.02 g/m$^2$.

1.0 part by weight of molybdenum disulfide (MOLY-POWDER PS, average particle size 0.4 μm, manufactured by Sumiko Lubricant Kabushiki Kaisha) as a lubricant, 1.0 part by weight of a polyacrylic acid (JULIMER AC-10L, manufactured by Nippon Junyaku K.K.) as a dispersion resin, 0.3 parts by weight of water and 0.7 parts by weight of a 25%-ammonia water were mixed to prepare a lubricant paste. 3 parts by weight of this lubricant paste was added to a hydrophilic topcoating chemicals (SURFALCOAT 160, manufactured by Nippon Paint Co., Ltd.) and stirred until the resulting mixture becomes uniform.

The hydrophilic topcoating chemicals containing this lubricant was applied to the primer coat of the aluminum plate by a roll coating method, and baked at 220° C. for 15 seconds in hot-air circulating furnace. The amount of the top coat prepared by this topcoating chemicals was 0.2 g/m$^2$.

The resulting aluminum fin plate having a two-layer coat was used as a test piece, and subjected to various tests in the same manner as in Example 1. The results are shown in Table 1.

EXAMPLES 21-29, 32 and 33

A primer coat was formed by primer coating chemicals containing no lubricant in the same manner as in Example 20. Each lubricant shown in Table 2 was added to the same topcoating chemicals as in Example 20, and this topcoating chemical was applied to the above primer coat in the same manner as in Example 20.

Each of the resulting test pieces was subjected to various tests in the same manner as in Example 1. The results are shown in Table 2.

EXAMPLES 30, 31

As shown in Table 2, using primer coating chemicals and topcoating chemicals both containing a lubricant, aluminum fin plates were surface-treated in the same manner as in Example 1. The surface treatment steps were the same as in Example 1.

Each of the resulting test pieces was subjected to various tests in the same manner as in Example 1. The results are shown in Table 2.

Comparative Examples 1-8

For comparison, with respect to primer coating chemicals containing a lubricant in which the amount of a higher aliphatic acid lubricant (calcium stearate) or a inorganic lubricant was smaller than the lower limit of the present invention (Comparative Examples 1, 3, 5 and 7), and those containing a lubricant in which the amount of the higher aliphatic acid lubricant or the inorganic lubricant was larger than the upper limit of the present invention (Comparative Examples 2, 4, 6 and 8), various tests were conducted in the same manner as in Example 1. Incidentally, the surface treatment method was the same as in Example 1.

The types and amounts of lubricants used and the results of each test are shown in Table 3.

As is clear from the comparison between Examples and Comparative Examples, the coat according to the present invention shows a smaller friction coefficient (good lubricating property), and excellent adhesion, hydrophilic property and alkali resistance.

TABLE I

| Example No. | Composition of Primer Coating Chemicals | | | Amount of Primer Coat (g/m$^2$) | |
|---|---|---|---|---|---|
| | Base Resin | Lubricant | Lubricant/ Resin[1] | Primer Coat | Top-Coat |
| 1 | Polyester-Urethane[2] | St-Ca[3] | 5/95 | 1.0 | 0.20 |
| 2 | Polyester-Urethane | St-Ca | 20/80 | 1.0 | 0.20 |
| 3 | Polyester-Urethane | St-Ca | 30/70 | 1.0 | 0.20 |
| 4 | Polyester-Urethane | St-Ca | 20/80 | 0.10 | 0.20 |
| 5 | Polyester-Urethane | St-Ca | 20/80 | 2.0 | 0.20 |
| 6 | Polyester-Urethane | St-Ca | 20/80 | 1.0 | 0.05 |
| 7 | Polyester-Urethane | St-Ca | 20/80 | 1.0 | 0.40 |
| 8 | Polyester-Urethane | Graphite[4] | 5/95 | 1.0 | 0.20 |
| 9 | Polyester-Urethane | Graphite | 20/80 | 1.0 | 0.20 |
| 10 | Polyester-Urethane | Graphite | 80/20 | 1.0 | 0.20 |
| 11 | Polyester-Urethane | MoS$_2$[5] | 5/95 | 1.0 | 0.20 |
| 12 | Polyester-Urethane | MoS$_2$ | 20/80 | 1.0 | 0.20 |
| 13 | Polyester-Urethane | MoS$_2$ | 80/20 | 1.0 | 0.20 |
| 14 | Polyester-Urethane | Graphite Fluoride[6] | 20/80 | 1.0 | 0.20 |
| 15 | Thermosetting Epoxy Resin[7] | St-Ca | 20/80 | 1.0 | 0.20 |
| 16 | Thermosetting Polyester Resin[8] | St-Ca | 20/80 | 1.0 | 0.20 |
| 17 | Thermosetting Acryl-Epoxy Resin[9] | St-Ca | 20/80 | 1.0 | 0.20 |
| 18 | Thermosetting Styrene. Acryl Resin[10] | St-Ca | 20/80 | 1.0 | 0.20 |
| 19 | Thermosetting Styrene. Acryl Resin | St-Ca/ Graphite | 10/10/80[11] | 1.0 | 0.20 |

| Example No. | Friction Coefficient | Hydrophilic Adhesion | Durability of Alkali Property | Resistance |
|---|---|---|---|---|
| 1 | ○ | ◎ | ◎ | ◎ |
| 2 | ◎ | ◎ | ◎ | ◎ |
| 3 | ◎ | ○ | ○ | ○ |
| 4 | ◎ | ◎ | ◎ | ◎ |
| 5 | ◎ | ◎ | ◎ | ◎ |
| 6 | ◎ | ◎ | ○ | ◎ |

TABLE I-continued

| | | | | |
|---|---|---|---|---|
| 7 | ⊙ | ⊙ | ⊙ | ⊙ |
| 8 | ○ | ⊙ | ⊙ | ⊙ |
| 9 | ⊙ | ⊙ | ⊙ | ⊙ |
| 10 | ⊙ | ⊙ | ⊙ | ○ |
| 11 | ○ | ⊙ | ⊙ | ⊙ |
| 12 | ⊙ | ⊙ | ⊙ | ⊙ |
| 13 | ⊙ | ⊙ | ⊙ | ○ |
| 14 | ⊙ | ○ | ⊙ | ○ |
| 15 | ⊙ | ⊙ | ⊙ | ⊙ |
| 16 | ⊙ | ⊙ | ⊙ | ⊙ |
| 17 | ⊙ | ⊙ | ⊙ | ⊙ |
| 18 | ⊙ | ⊙ | ⊙ | ⊙ |
| 19 | ⊙ | ⊙ | ⊙ | ⊙ |

Note
[1] Weight ratio.
[2] HYDRAN HW-350, manufactured by Dainippon Ink and Chemicals, Inc.
[3] Calcium stearate, ALFO DISPER C, manufactured by Adeka Fine Chemicals K.K
[4] SUMIKO RELEASE W2, manufactured by Sumiko Lubricant K.K.
[5] MOLYPOWDER PS, manufactured by Sumiko Lubricant K.K.
[6] SEFBON CMF, manufactured by Central Glass Co., Ltd.
[7] EPOLSION HC-25, manufactured by Kanebo NSC.
[8] VIRONAL MD1200, manufactured by Toyobo Co., Ltd.
[9] ARORON 290, manufactured by Nippon Shokubai Kagaku Kogyo Co., Ltd.
[10] YODOSOL GD51, manufactured by Kanebo NSC.
[11] Lubricant/lubricant/base resin.

TABLE 2

Composition of Primer Coating Chemicals

| Example No. | Base Chemicals (Base Resin) | Lubricant | Lubricant/Resin[1] | Amount of Primer Coat (g/m$^2$) |
|---|---|---|---|---|
| 20 | SURFALCOAT 430A/B(12) | — | — | 0.02 |
| 21 | SURFALCOAT 430A/B | — | — | 0.02 |
| 22 | SURFALCOAT 430A/B | — | — | 0.02 |
| 23 | SURFALCOAT 430A/B | — | — | 0.02 |
| 24 | SURFALCOAT 430A/B | — | — | 0.02 |
| 25 | SURFALCOAT NR-2(13) | — | — | 0.02 |
| 26 | SURFALCOAT NR-2 | — | — | 0.02 |
| 27 | SURFALCOAT NR-2 | — | — | 0.02 |
| 28 | SURFALCOAT NR-2 | — | — | 0.02 |
| 29 | SURFALCOAT NR-2 | — | — | 0.02 |
| 30 | SURFALCOAT NR-2 | — | — | 0.02 |
| 31 | SURFALCOAT 430A/B | MoS$_2$[5] | 20/80 | 0.2 |
| 32 | SURFALCOAT 430A/B | — | — | 0.02 |
| 33 | SURFALCOAT 430A/B | — | — | 0.02 |

Composition of Topcoating Chemicals[11]

| Example No. | Lubricant | Lubricant/Resin[1] | Amount of Topcoat (g/m$^2$) |
|---|---|---|---|
| 20 | MoS$_2$[5] | 20/80 | 0.2 |
| 21 | MoS$_2$ | 80/20 | 0.2 |
| 22 | Graphite[4] | 20/80 | 0.2 |
| 23 | Graphite | 80/20 | 0.2 |
| 24 | Graphite Fluoride[6] | 20/80 | 0.2 |
| 25 | MoS$_2$ | 20/80 | 0.2 |
| 26 | MoS$_2$ | 80/20 | 0.2 |
| 27 | Graphite | 20/80 | 0.2 |
| 28 | Graphite | 80/20 | 0.2 |
| 29 | Graphite Fluoride | 20/80 | 0.2 |
| 30 | MoS$_2$ | 20/80 | 0.2 |
| 31 | MoS$_2$ | 80/20 | 0.2 |
| 32 | MoS$_2$/St-Ca | 10/10/80[14] | 0.2 |
| 33 | St-Ca | 20/80 | 0.2 |

| Example No. | Friction Coefficient | Hydrophilic Adhesion | Durability of Alkali Property | Resistance |
|---|---|---|---|---|
| 20 | ○ | ⊙ | ⊙ | ○ |
| 21 | ⊙ | ○ | ⊙ | ○ |
| 22 | ○ | ⊙ | ⊙ | ○ |
| 23 | ⊙ | ○ | ⊙ | ○ |
| 24 | ⊙ | ○ | ○ | ○ |
| 25 | ○ | ⊙ | ⊙ | ⊙ |
| 26 | ⊙ | ⊙ | ○ | ⊙ |
| 27 | ○ | ⊙ | ○ | ⊙ |
| 28 | ⊙ | ⊙ | ○ | ⊙ |
| 29 | ⊙ | ⊙ | ○ | ⊙ |
| 30 | ⊙ | ⊙ | ⊙ | ⊙ |
| 31 | ⊙ | ○ | ⊙ | ⊙ |
| 31 | ⊙ | ⊙ | ○ | ⊙ |
| 32 | ⊙ | ⊙ | ○ | ○ |
| 33 | ○ | ⊙ | ○ | ○ |

Note
[1]-[6] Same as (1)-(6) in Table 1.
[11] Treatment chemicals used as base resin is SURFALCOAT 60 manufactured by Nippon Paint Co., Ltd.
[12], [13] Products manufactured by Nippon Paint Co., Ltd.

TABLE 3

| Comp. Example No. | Composition of Primer Coating Chemicals | | Lubricant/Resin[1] | Amount of Coat (g/m$^2$) | | Friction Coefficient | Adhesion | Durability of Hydrophilic Property | Alkali Resistance |
|---|---|---|---|---|---|---|---|---|---|
| | Base Resin | Lubricant | | Primer Coat | Top-Coat | | | | |
| 1 | Polyester-Urethane[2] | St-Ca[3] | 4/96 | 1.0 | 0.2 | △ | ⊙ | ⊙ | ⊙ |
| 2 | Polyester-Urethane | St-Ca | 35/65 | 1.0 | 0.2 | ⊙ | X | △ | △ |
| 3 | Polyester-Urethane | Graphite[4] | 4/96 | 1.0 | 0.2 | △ | ⊙ | ⊙ | ⊙ |
| 4 | Polyester-Urethane | Graphite | 85/15 | 1.0 | 0.2 | ⊙ | ○ | ⊙ | X |
| 5 | Polyester-Urethane | MoS$_2$(5) | 4/96 | 1.0 | 0.2 | △ | ⊙ | ⊙ | ⊙ |
| 6 | Polyester-Urethane | MoS$_2$ | 85/15 | 1.0 | 0.2 | ⊙ | ○ | ⊙ | X |
| 7 | Polyester-Urethane | Graphite Fluoride[6] | 4/96 | 1.0 | 0.2 | △ | ⊙ | ⊙ | ⊙ |
| 8 | Polyester-Urethane | Graphite Fluoride | 85/15 | 1.0 | 0.2 | ⊙ | △ | △ | △ |
| 30 | NR-2 Polyester-Urethane(2) | St-Ca[3] | 5/95 | 1.0 | | | | | |

Note
[1]-[6] Same as (1)-(6) in Table 1.

As described above in detail, the cured coat formed on an aluminum or aluminum alloy substrate according to the present invention is excellent not only in a lubricating property but also in a hydrophilic property, and further it shows excellent adhesion, alkali resistance and durability.

Such a cured coat of the present invention enables aluminum or aluminum alloy substrate to maintain good workability even though a volatile lubricating oil is used as a working oil. Accordingly, it is highly preferable as a lubricating and hydrophilic coat for aluminum or aluminum alloy substrates for heat exchanger fins, etc.

What is claimed is:

1. An aqueous primer coating composition for forming a cured primer coat having lubricating and hydrophilic properties consisting essentially of a primer coating chemical, water, and a compound (D) selected from the group consisting of ammonia water, amine compounds, organic acids and inorganic acids, said primer coating chemical consisting essentially of at least one thermosetting water-soluble or thermosetting water-dispersible resin component (A) selected from the group consisting of acrylic copolymer resins, urethane resins, alkyd resins, epoxy resins and thermosetting polyamide resins, and a lubricant (B) selected from the group consisting of a higher aliphatic acid lubricant, an inorganic lubricant and a higher aliphatic acid lubricant and an inorganic lubricant, a weight ratio of said resin component (A) to said lubricant (B) on a solid basis being:
   (a) where said lubricant is the higher aliphatic acid lubricant, 95/5 to 70/30,
   (b) where said lubricant is the inorganic lubricant, 95/5 to 20/80, and
   (c) where said lubricant is the higher aliphatic acid lubricant and the inorganic lubricant, 95/5 to 20/80, a weight ratio of said resin component (A) to said higher aliphatic acid lubricant being 95/5 to 70/30.

2. The aqueous primer coating composition according to claim 1, wherein said weight ratio of said resin component (A) to said lubricant (B) on a solid basis is:
   (a) where said lubricant is the higher aliphatic acid lubricant, 85/15 to 60/40,
   (b) where said lubricant is the inorganic lubricant, 85/15 to 30/70, and
   (c) where said lubricant is the higher aliphatic acid lubricant and the inorganic lubricant, 85/15 to 30/70, a weight ratio of said resin component (A) to said higher aliphatic acid lubricant being 85/15 to 60/40.

3. The aqueous primer coating composition according to claim 1, wherein said thermosetting water-soluble or thermosetting water-dispersible resin component has a functional group selected from the group consisting of a carboxyl group, a hydroxyl group and an amino group.

4. An aqueous topcoating composition comprising a topcoating chemical and water for forming a lubricating and hydrophilic topcoat, said topcoating chemical consisting essentially of a resin component (C) containing a carboxymethylcellulose derivative and N-methylolacrylamide, and a lubricant (B) selected from the group consisting of a higher aliphatic acid lubricant, an inorganic lubricant and a higher aliphatic acid lubricant and an inorganic lubricant, a weight ratio of said resin component (C) to said lubricant (B) on a solid basis being:
   (a) where said lubricant is the higher aliphatic acid lubricant 95/5 to 70/30,
   (b) where said lubricant is the inorganic lubricant 95/5 to 20/80
   (c) where said lubricant is the higher aliphatic acid lubricant and the inorganic lubricant, 95/5 to 20/80, a weight ratio of said resin component (C) to said higher aliphatic acid lubricant being 95/5 to 70/30.

5. The aqueous topcoating composition according to claim 4, wherein said weight ratio of said resin component (C) to said lubricant (B) on a solid basis is:
   (a) where said lubricant is the higher aliphatic acid lubricant 85/15 to 60/40,
   (b) where said lubricant is the inorganic lubricant 85/15 to 30/70, and
   (c) where said lubricant is the higher aliphatic acid lubricant and the inorganic lubricant, 85/15 to 30/70 a weight ratio of said component (A) to said higher aliphatic acid lubricant being 85/15 to 60/40.

6. The aqueous topcoating composition according to claim 4, wherein said resin component (C) comprises 5–25 parts by weight of a sodium salt and/or a potassium salt of a carboxymethylcellulose, 25–50 parts by weight of an ammonium salt of carboxymethylcellulose, and 25–70 parts by weight of N-methylolacrylamide, on a solid basis.

7. The aqueous topcoating composition according to claim 4, further containing polyacrylic acid and a zirconium compound, the amount of said polyacrylic acid being 1.5–15 parts by weight, and the amount of said zirconium compound being 0.6–9 parts by weight as Zr, per 100 parts by weight of the total of the component (C).

* * * * *